(12) United States Patent
Wake et al.

(10) Patent No.: US 7,549,482 B2
(45) Date of Patent: Jun. 23, 2009

(54) IMPLEMENT WITH TWO STAGE FOLDING WING

(75) Inventors: William Allen Wake, Deer River, MN (US); Nicholas Dean Pederson, Hill City, MN (US); Jacob N Gust, Fargo, ND (US)

(73) Assignee: CNH America LLC, New Holand, PA (US)

( * ) Notice: Subject to any disclaimer, the term of this patent is extended or adjusted under 35 U.S.C. 154(b) by 0 days.

(21) Appl. No.: 11/777,751

(22) Filed: Jul. 13, 2007

(65) Prior Publication Data

US 2009/0014190 A1    Jan. 15, 2009

(51) Int. Cl.
    *A01B 49/00*    (2006.01)
(52) U.S. Cl. ........................................ 172/311; 111/57
(58) Field of Classification Search ................. 172/311, 172/452, 453, 454, 456, 459, 310, 317, 460, 172/630, 457, 458, 634.5, 776; 111/54, 56, 111/57, 62; 56/134, 159, 228
See application file for complete search history.

(56) References Cited

U.S. PATENT DOCUMENTS

| | | | | |
|---|---|---|---|---|
| 21,739 | A | * | 10/1858 | Carrington .................... 172/57 |
| 638,769 | A | | 12/1899 | Smith |
| 650,273 | A | * | 5/1900 | Potter ......................... 172/456 |
| 2,298,161 | A | * | 10/1942 | Robinson, Jr. .............. 172/456 |
| 3,401,752 | A | * | 9/1968 | Olav Nja ..................... 172/452 |
| 3,521,906 | A | | 7/1970 | Parker |
| 3,669,195 | A | | 6/1972 | Green et al. |
| 3,809,316 | A | * | 5/1974 | Dreyer ....................... 239/167 |
| 4,050,523 | A | | 9/1977 | Poland |
| 4,148,174 | A | * | 4/1979 | Mathews et al. ............. 56/12.7 |
| 4,467,875 | A | | 8/1984 | Lewison |
| 4,683,957 | A | | 8/1987 | Bussiere |
| 4,878,545 | A | | 11/1989 | Dyken |
| 5,303,779 | A | * | 4/1994 | Friggstad .................... 172/311 |
| 5,660,034 | A | * | 8/1997 | Gates et al. .................. 56/504 |
| 6,003,615 | A | | 12/1999 | Moore |
| 6,293,353 | B1 | | 9/2001 | Poole |
| 6,382,327 | B1 | * | 5/2002 | Mosdal ....................... 172/311 |
| 6,401,832 | B1 | * | 6/2002 | Payne et al. ................. 172/238 |
| 6,675,907 | B2 | * | 1/2004 | Moser et al. ................ 172/311 |
| 6,761,228 | B2 | * | 7/2004 | Dobson et al. .............. 172/311 |
| 7,210,538 | B2 | * | 5/2007 | Gust .......................... 172/311 |
| 2002/0017090 | A1 | | 2/2002 | Hockenbeck | |

* cited by examiner

*Primary Examiner*—Thomas B Will
*Assistant Examiner*—Matthew D Troutman
(74) *Attorney, Agent, or Firm*—Rebecca Henkel (57) ABSTRACT

A towed agricultural implement including a center section having a chassis supported on wheels, and with a pair of selectively positionable wing assemblies extending laterally from each side. The wing assemblies include an arm assembly operably coupled at one end to the center section, and operably coupled at the other end to a wing frame. The wing assemblies are positionable in a folded-down position, wherein the wing frames are generally parallel to the ground, and a folded-up position wherein the wing frames are positioned generally perpendicular to the ground.

19 Claims, 5 Drawing Sheets

IMPLEMENT WITH TWO STAGE FOLDING WING

FIELD OF THE INVENTION

The present invention relates to agricultural implements, and more specifically, to towed agricultural implements with folding wing assemblies.

BACKGROUND OF THE INVENTION

Vehicle-towed agricultural implements are commonly employed to efficiently accomplish a wide variety of farming tasks, such as cultivating and seeding. These implements may be very wide, so as to cover a large swath of land with each pass of the implement, thereby reducing the number of passes needed and accordingly reducing the amount of time needed to accomplish a given farming task.

Generally, wide agricultural implements present at least two well-known design considerations. Some operations, such as crop seeding, require a relatively high degree of precision. Small grain seeds, for example, must be within fractions of an inch of a recommended depth to achieve proper growth and best yield. To achieve the requisite degree of precision, an agricultural implement must be capable of accurately following what may be slightly uneven ground across the width of the implement.

Agricultural implements must also be efficiently transportable between fields that may be separated by miles. Moreover, the fields may be fenced, and accordingly, the implement must be capable of passing through narrow fence gates without undue difficultly.

These design considerations have typically dictated that wide agricultural implements be configured with a center section having one or more wing sections extending laterally outward from each side. The wing sections are coupled so as to enable some degree of independent vertical movement of the wings relative to the center section as the implement passes over uneven ground. Also, the wings are usually positionable in a folded arrangement to enable the implement to be transported over a public road or to negotiate a narrow fence gate. Examples of implements with various prior folding wing arrangements are described in U.S. Pat. Nos. 3,669,195; 4,050,523; 4,415,043; 4,467,875; 4,576,238; 4,683,957; 4,878,545; and 6,125,775, all of which are hereby fully incorporated herein by reference.

A recent trend in agriculture is toward minimal-till or no-till planting methods. In such methods, where extensive cultivation is not used to break-up the soil and to disperse crop residue material from the previous season, the seed planter implement may need to be capable of supplying significant down pressure to planter units. Typically, down pressure is supplied by weight of the wing sections and other portions of the seeder implement. As a consequence, the folding portions of the seed planter implement need to be structurally capable of handling significant loads imposed by the weight of the wing sections.

Previous folding wing seed planters and other such implements typically have a relatively wide center section fitted with tool assemblies, and single-pivot folding wings on each side with tool assemblies on each. While such a configuration is simple and provides relatively good ground-following characteristics, the center section tool assemblies are typically not easily repositionable for transport. As a consequence, ground clearance is limited at the center section during transport, and the tool assemblies may be subject to damage from ground contact. If repositioned for transport, the center section tool assemblies may require extensive readjustment prior to the next use. Other previous folding wing mechanisms used in agricultural implements often have complex arrangements of pivots and linkages not easily adapted for the high loads and resultant stresses of no-till seed planter equipment and other high load applications.

What is still needed in the industry is a towed agricultural implement suitable for high load applications and having a simple and efficient means for repositioning tool assemblies for transport.

SUMMARY OF THE INVENTION

The present invention substantially meets the needs of the industry for a towed agricultural implement suitable for high load applications and having a simple and efficient means for repositioning tool assemblies for transport. The implement of the present invention includes a center section having a chassis supported on wheels, and with a pair of selectively positionable wing assemblies extending laterally from each side. The wing assemblies include an arm assembly operably coupled at one end to the center section, and operably coupled at the other end to a wing frame. The wing frame has a plurality of tool assemblies attached thereto, and the tool assemblies may be uniformly spaced apart across the width of the wing frame. The wing assemblies are positionable in a folded-down position, wherein the wing frames are generally parallel to the ground, and a folded-up position wherein the wing frames are positioned generally perpendicular to the ground.

In the folded-down position, the wing frames extend under the chassis so that tool assemblies may be positioned uniformly across the entire width spanned between the outer ends of the folded-down wing frames, including the area under the chassis. The wing frames are free to move slightly vertically to accommodate variations in the ground surface as the implement is towed. In the folded-up position, the wing frames are positioned to the sides of the chassis, leaving the entire area under the chassis unobstructed for ground clearance.

Accordingly, the invention includes a towable agricultural implement having a center section including a chassis supported on a plurality of ground engaging wheels so that the chassis is spaced apart from the ground. A pair of wings extends laterally on opposite sides of the center section, each wing including an arm assembly operably coupled with a wing frame. Each wing frame has a proximal end and a distal end defining a width dimension therebetween. The wing frame has a plurality of tool assemblies uniformly spaced apart thereon across the width dimension. The arm assembly of each wing is operably coupled with the center section so that the wings are selectively shiftable between a folded-down position wherein the wing frames are generally parallel with the ground and the proximal end of each wing frame extends under the chassis proximate the other wing frame, and a folded-up position wherein the wing frames are generally perpendicular with the ground and the proximal ends of the wing frames are laterally spaced apart from the chassis on opposite sides of the center section.

DETAILED DESCRIPTION OF THE PREFERRED EMBODIMENTS

Implement 10 according to the invention generally includes center section 12 and a pair of wing assemblies 13. Each wing assembly 13 includes a wing frame 14, coupled to center section 12 by a pivot arm assembly 16.

Center section 12 generally includes chassis 18, rear wheel assembly 20, front wheel assemblies 22, 24, and tongue assembly 26. Chassis 18 generally includes a pair of longitudinal beams 28, 30, which are spaced apart and structurally connected by front cross-plate 32 and rear cross-plate 34, and front frame 35. Front frame 35 generally includes front beam 36 which structurally couples front wheel mount beams 38 and 40. Front frame 35 may be structurally connected with longitudinal beams 28, 30, with hex bolts 41, or by welding. Front wheel assemblies 22, 24, are pivotally attached to front wheel mount beams 38, 40, respectively, at pivots 42, 44, so that each front wheel assembly is pivotable about a vertical axis, annotated a-a in the Figures.

Rear wheel assembly 20 generally includes axle 46 and a pair of wheels 48, 50, which are each attached at opposing ends of axle 46, with a rotatable hub 52. Axle 46 is attached to chassis 18 at the rear ends of longitudinal beams 28, 30, by welding or other suitable attachment method. Gusset blocks 54 may be added to strengthen the connection between axle 46 and longitudinal beams 28, 30.

Each front wheel assembly 22, 24, generally includes a pair of wheels 56, 58, rotatably mounted on either side of wheel tower 60, which is pivotably attached to chassis 18 at pivots 42, 44, as previously described. Each wheel 56, 58, includes pneumatic tire 62 which is mounted on rim 64. As depicted, wheels 56, 58, may be slightly offset from each other in a fore-and aft direction to improve tracking of the wheel assembly 22, 24, when implement 10 is towed.

Tongue assembly 26 generally includes a tongue member 66 and a hitch 68. Tongue member 66 generally includes a pair of beams 70, 72, coupled by cross members 74, 76. Hitch 68, which may be a pintle hitch as depicted or any other type of suitable hitch member, is attached at forward end 78 of tongue member 66 using bolts 80, or any other suitable means. Rear end 82 of tongue member 66 is coupled to chassis 18 at pivot connections 84. Tongue assembly 26 is vertically pivotable about pivot connections 84 to enable differential vertical movement of implement 10 relative to the tow vehicle. In an alternative embodiment for use with a three-point tow vehicle hitch as is commonly known in the art, front wheel assemblies 22, 24, and pivot connections 84 may be omitted so that implement 10 is supported on rear wheel assembly 20 and the connection with the tow vehicle.

Each wing frame 14 generally includes a pair of lateral beams 86, end member 88, and cross-member assembly 90. Cross-member assembly 90 generally includes uprights 92, 94, and cross-beam 96. Each upright 92, 94, is formed by a pair of plates 98, 100, sandwiching a spacer 102. Spacer 102 is dimensioned so plates 98, 100, fit snugly around and confront lateral beam 86. End member 88 spaces apart and connects lateral beams 86. Gusset 104 may be provided at each connection of end member 88 and lateral beams 86 to improve the overall strength of the connection and inhibit any racking of wing frame 14 under load. Wing frame 14 presents a proximal end 105 and a distal end 105a defining a wing frame width dimension WI therebetween.

Figure 4:
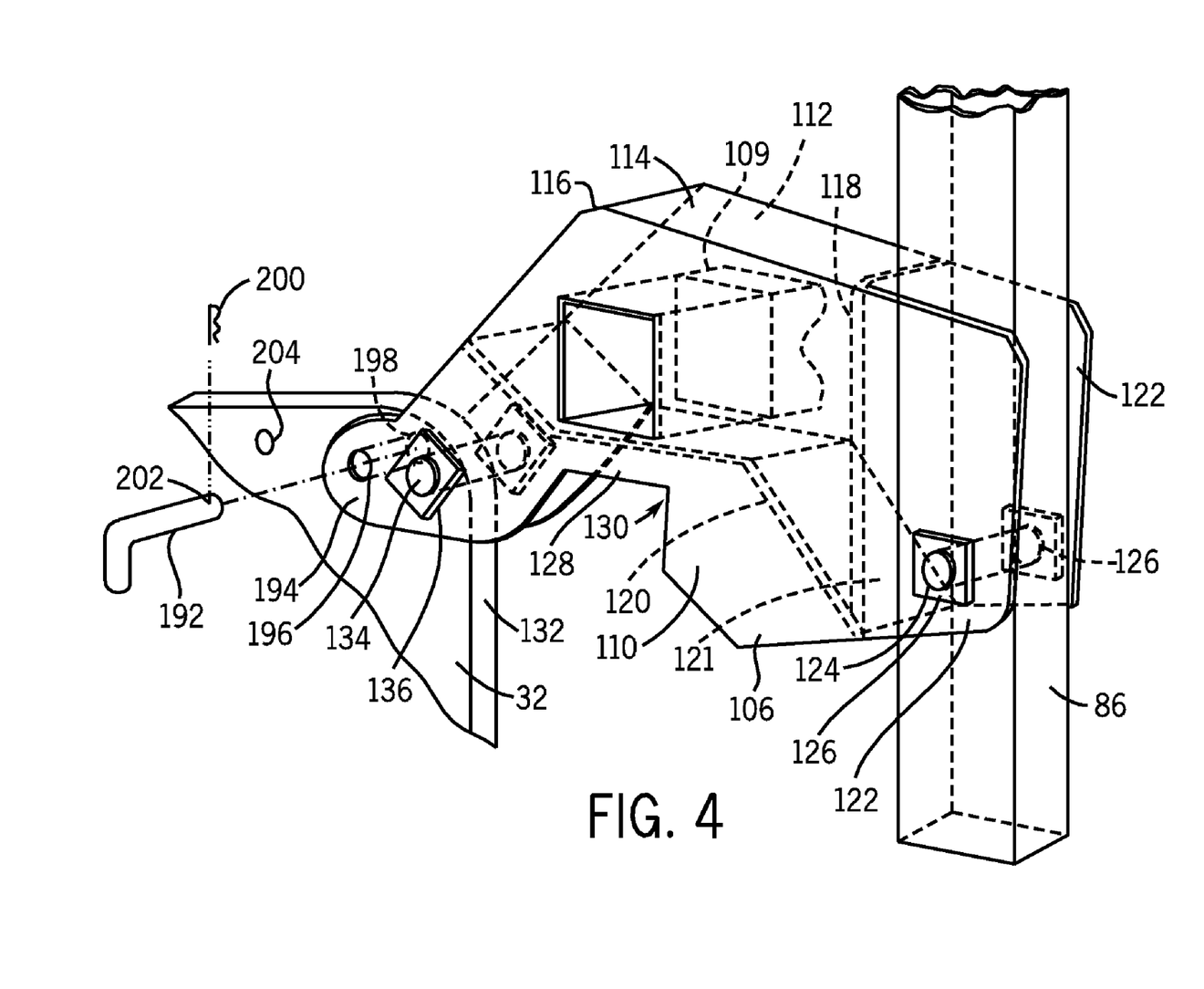
FIG. 4 is a perspective view of the front arm body portion of the implement.

Pivot arm assembly 16 generally includes a front arm body 106, a rear arm body 108 and a connecting beam 109. Front arm body 106 is a hollow enclosure defined by a pair of spaced-apart plates 110, 112. Exterior side plate 114 is welded along the periphery 116 of each plate 110, 112, and wraps inwardly to form contact pad 118. Interior spacer 120 is also welded to each plate 110, 112, and also wraps inwardly to form arm stop 121. Bottom portion 122 of each plate 110, 112, extends below contact pad 118 and arm stop 121 to form a recess for receiving one of lateral beams 86 of wing frame 14. Lower pivot pin 124 extends through each plate 110, 112, and lateral beam 86, and is retained in place with a retainer 126 on the outer surface of each plate 110, 112. Lateral beam 86 is vertically pivotable on lower pivot pin 124 between the stops provided by contact pad 118 and arm stop 121.

Inner portion 128 of each plate 110, 112, extends inwardly from interior spacer 120 to form inner recess 130 for receiving the edge 132 of front cross plate 32. Upper pivot pin 134 extends through plates 110, 112 and front cross plate 32, and is retained in place with a retainer 136 on the outer surface of each plate 110, 112. Front arm body 106 is vertically pivotable on upper pivot pin 134.

Figure 5:
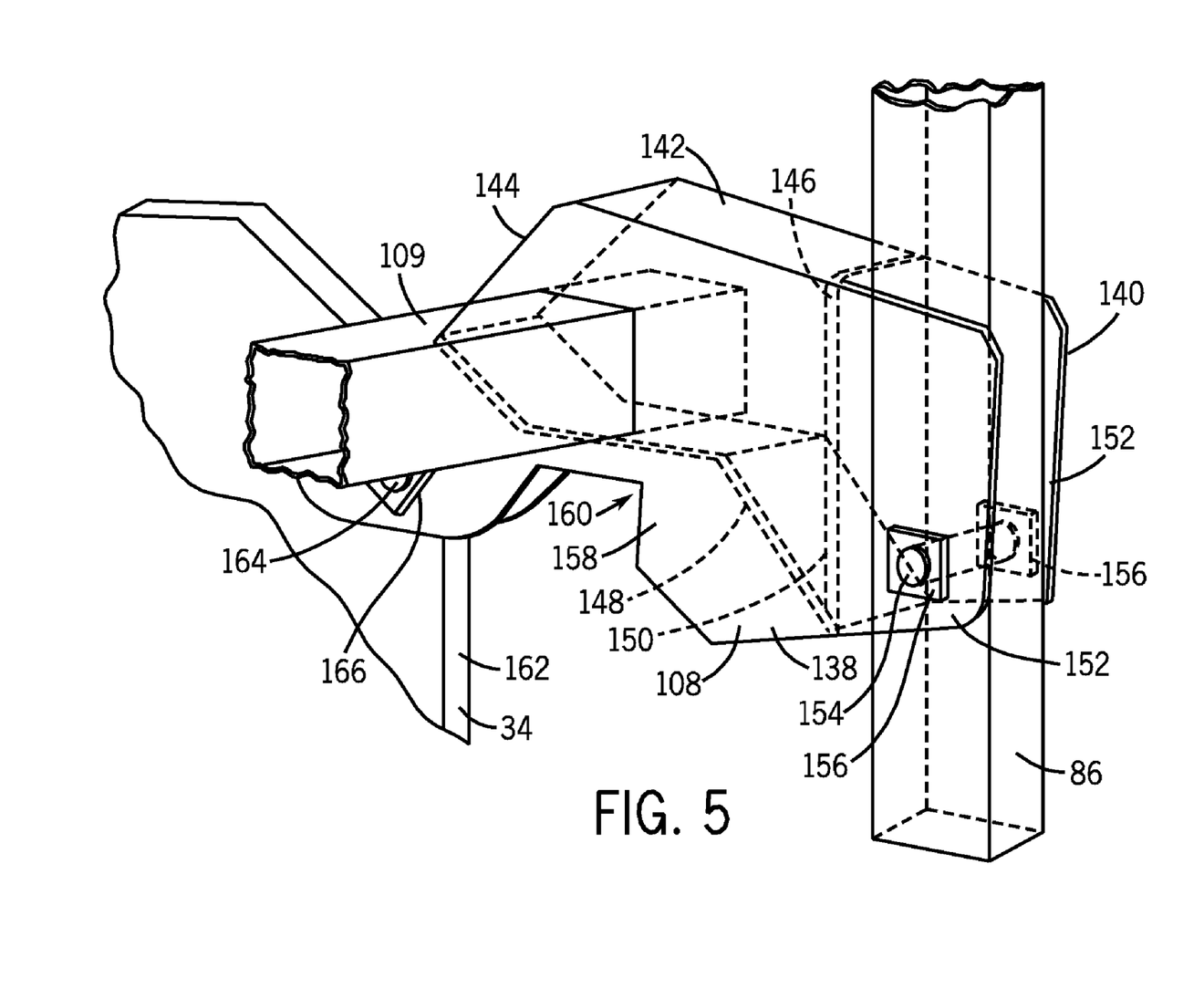
FIG. 5 is a perspective view of the rear arm body portion of the implement.

Rear arm body 108 is a hollow enclosure similar to front arm body 106, and includes a pair of spaced-apart plates 138, 140. Again, exterior side plate 142 is welded along the periphery 144 of each plate 138, 140, and wraps inwardly to form contact pad 146. Interior spacer 148 is also welded to each plate 138, 140, and also wraps inwardly to form arm stop 150. Bottom portion 152 of each plate 138, 140, extends below contact pad 146 and arm stop 150 to form a recess for receiving the other of lateral beams 86 of wing frame 14. Lower pivot pin 154 extends through each plate 138, 140, and lateral beam 86, and is retained in place with a retainer 156 on the outer surface of each plate 138, 140. Lateral beam 86 is vertically pivotable on lower pivot pin 154 between the stops provided by contact pad 146 and arm stop 150.

Inner portion 158 of each plate 138, 140, extends inwardly from interior spacer 148 to form inner recess 160 for receiving the edge 162 of rear cross plate 34. Upper pivot pin 164 extends through plates 138, 140 and rear cross plate 34, and is retained in place with a retainer 166 on the outer surface of each plate 138, 140. Rear arm body 108 is vertically pivotable on upper pivot pin 164.

Connecting beam 109 extends through plates 110, 112, 128 and 130, and is welded at the outwardly facing surface of each, forming a rigid connection between front arm body 106 and rear arm body 108. As a result, pivot arm assembly 16 is pivotally mounted as a single, integral member on upper pivot pins 134, 164.

It will of course be appreciated that the present invention is not limited to the configuration depicted and that a variety of alternative arm assembly and wing frame configurations are contemplated within the scope of the present invention. Such alternative configurations may include configurations with a single arm body or any other number of arm bodies coupled with wing frames having a single lateral beam or any other number of separate members.

Each wing frame 14 may have an outrigger wheel assembly 168 positioned on lateral beam 86 near end member 88 to provide support at the outer edge of wing frame 14. Outrigger wheel assembly 168 generally includes mount 170, wheel fork 172, and wheel 174. Mount 170 generally includes a pair of clamps 176 for clamping to lateral beam 86 and a pivot body 178. Wheel fork 172 is pivotally mounted in pivot body 178 about a vertical axis, annotated b-b in the Figures. Wheel fork 172 includes top bar 180 with a pair of trailing bars 182 extending diagonally downward on either side of wheel 174, so that hub 184 of wheel 174 is offset from vertical axis b-b. As a result, wheel assembly 168 is configured is caster fashion so that it is self-aligning with forward movement of implement 10.

A toolbar 186 is attachable to each lateral beam 86 using clamps 188. Multiple tool assemblies 189 may be attached to each toolbar 186, or directly to lateral beam 86. Tool assemblies 189 may be a single disk planter assembly as disclosed in co-pending U.S. patent application Ser. No. 10/045,558 and U.S. Pat. No. 6,386,127, the planter assemblies disclosed in U.S. Pat. No. 6,564,730, each commonly owned by the owners of the present invention, and fully incorporated herein by reference. Tool assemblies 189 may also be any other agricultural tool assembly type such as for example row crop seeders, or fertilizer application equipment.

Tool assemblies 189 are typically uniformly spaced apart across the width W1 of each wing frame 14 so as to accommodate uniform spacing of crop rows. Where narrow crop row spacing is required, such as for small grain crops, tool assemblies 189 may be staggered on the parallel lateral beams 86 of wing frames 14 so that adjacent tool assemblies 189 on each lateral beam 86 are positioned at every other crop row.

Figure 1:
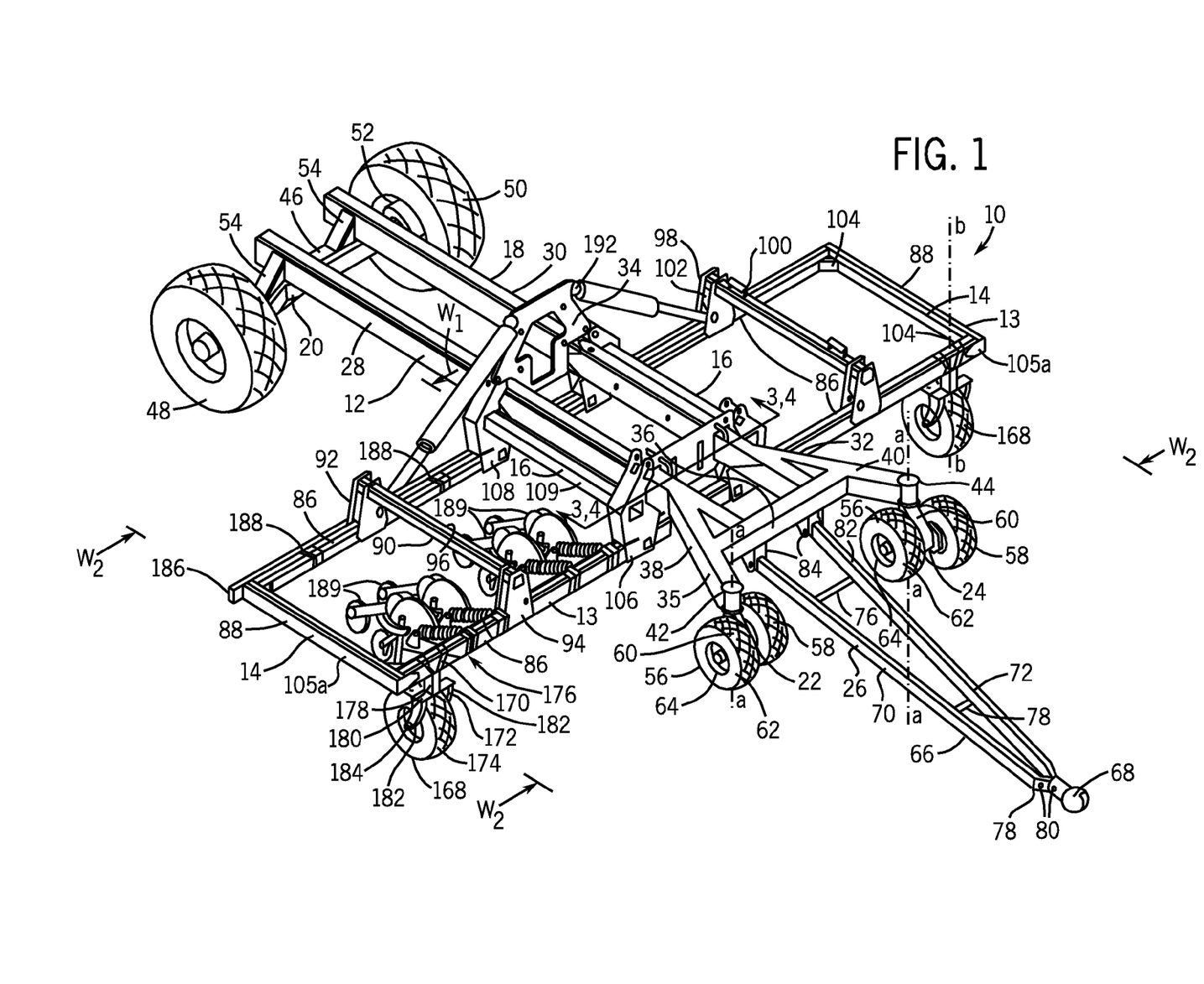
FIG. 1 is a perspective view of the folding wing agricultural implement of the present invention.
Figure 2:
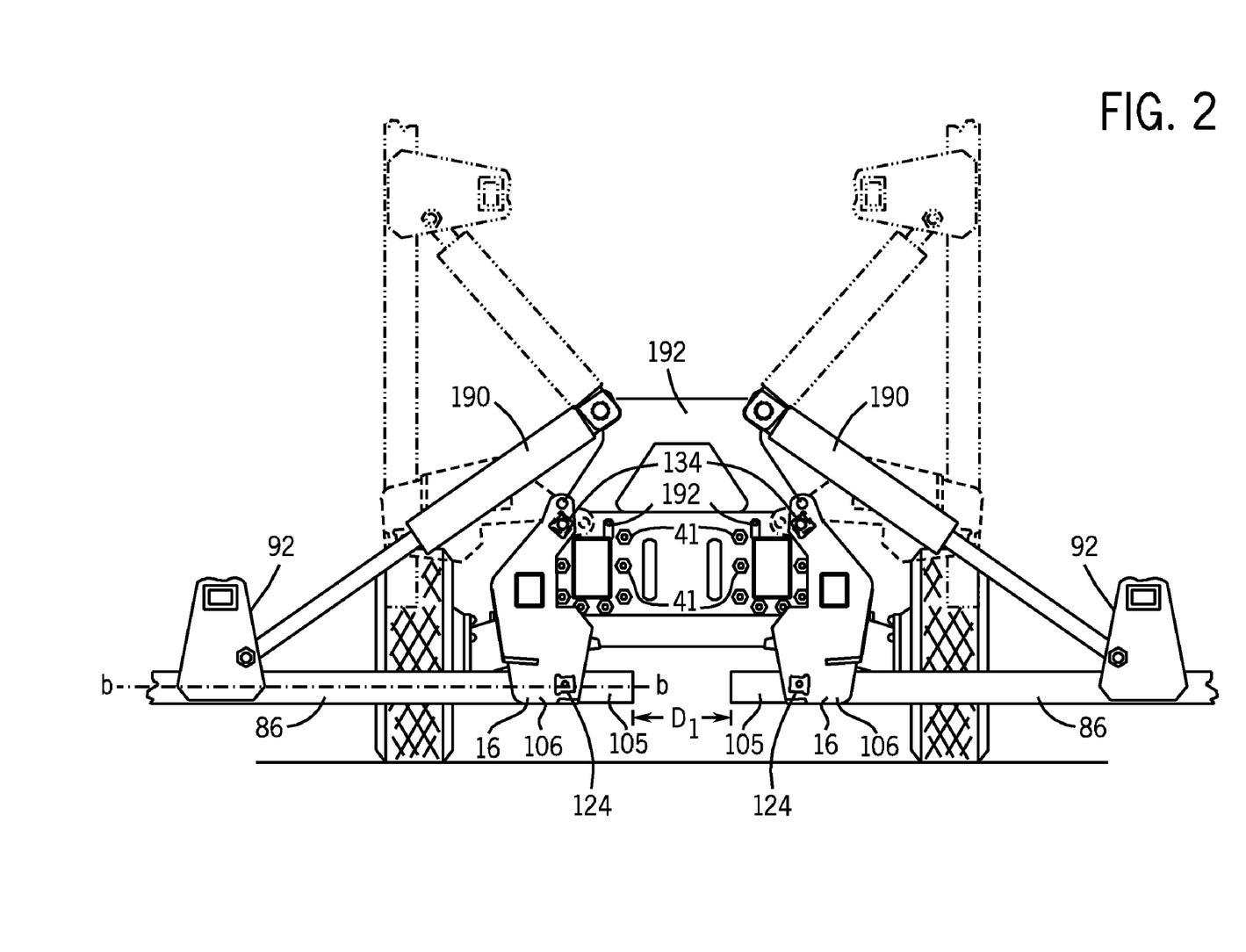
FIG. 2 is a partial cross-sectional view of the implement of FIG. 1, depicting the folding wings in a folded-out position for use.

When wing assemblies 13 are positioned in the folded down position depicted in FIGS. 1 and 2, proximal ends 105 of wing frames 14 are spaced apart under chassis 18 by a distance, annotated D1 in the Figures. It is preferred that distance D1 be sufficiently small so that tool assemblies 189 may be uniformly spaced along wing frames 14 across the entire width of implement 10 between distal ends 105a of wing frames 14, annotated W2 in the Figures, including the area under chassis 18.

Figure 3:
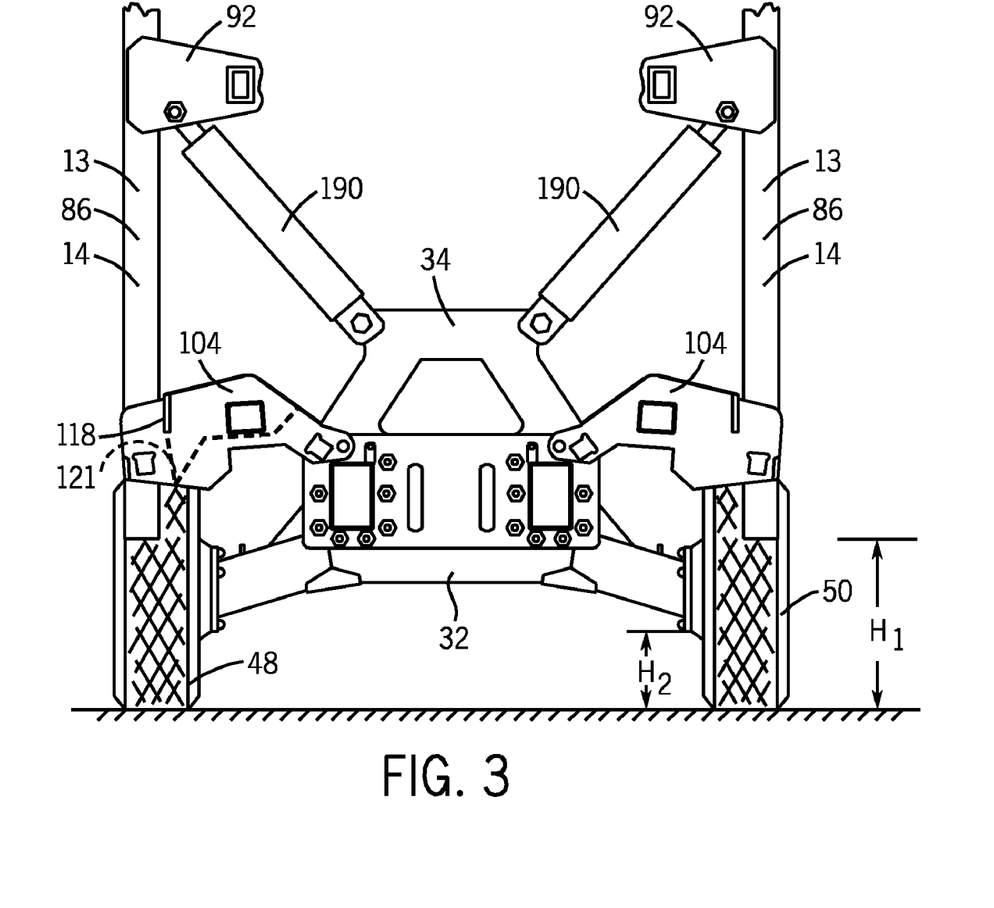
FIG. 3 is a partial cross-sectional view as in FIG. 2, depicting the folding wings in a folded-up position for transport.

Hydraulic cylinders 190 are mounted between upright 92 of each wing frame 14 and upper portion 192 of rear cross plate 34 to provide a means for positioning wing frames 14 in the folded-down use position depicted in FIGS. 1 and 2, and the folded-up transport position depicted FIG. 3. Hydraulic cylinders 190 may be connected with any suitable hydraulic power source and control system, such as are commonly known and used in the art. It will be appreciated that hydraulic cylinders 190 and the associated hydraulic control system may be configured so as to enable wing frames 14 to "float" vertically, pivoting about lower pivot pins 124, 154, or alternatively configured so as to provide additional down pressure to the wing assemblies 13 if required for engagement of tool assemblies 189 in the ground.

It is generally preferred in order to minimize load on hydraulic cylinders 190 and other components of the hydraulic system that when wing assemblies 13 are positioned in the folded-up position, the wing frames 14 be generally perpendicular with ground surface. In a perpendicular position, the weight of wing assembly 13 is directed vertically through pivot pins 124, 134, 154, 164, minimizing horizontal force components to be absorbed by the hydraulic system. Wing assemblies 13 may also be positioned, however, with wing frames 14 angled slightly inward or outward, although this is less preferred. For the purposes of this application, the term "generally perpendicular" is defined to include a range of angles between wing frame 14 and the ground of between 70 and 110 degrees.

Wing lock pins 192 may be provided to lock wing assemblies 13 in the upright position and thereby prevent wing assemblies 13 from falling due to failure of the hydraulic system. Each plate 110, 112, of front arm body 106 has tab portion 194 with lock aperture 196 defined therein. Front cross plate 32 of chassis 18 has corresponding lock aperture 198 defined therein. When wing assemblies 13 are positioned in the folded-up position depicted in FIG. 3, wing lock pin may be inserted through lock apertures 196, 198, to lock wing assemblies 13 in the upright position. Cotter pin 200 may be inserted through aperture 202 in lock pin 192 to secure it in place. When wing assemblies 13 are in the folded down position, each wing lock pin 192 may be inserted into apertures 204 for storage as depicted in FIGS. 1 and 2. A similar wing lock pin arrangement may be provided in rear arm bodies 108 and rear cross plate 34, in addition or as an alternative to the above described arrangement. If a hydraulic cylinder 190 is provided for wing positioning, it is most preferable that the wing locking arrangement be provided in the same vertical plane as the hydraulic cylinder 190 so as to prevent twisting of the wing assembly 13 in the event of accidental actuation of the hydraulic cylinder 190 with the wing lock engaged.

It will also be appreciated that any other suitable mechanical locking arrangement may be used as an alternative. Moreover, reliability of the locking arrangement may be improved with an automatic or powered mechanical locking system. For example, a spring loaded pin mechanism (not depicted) mounted on the chassis 18 may be positioned so as to engage an aperture in each wing assembly 13 as the wing assemblies are positioned from the folded-down to the folded up position. Once engaged in the aperture, the spring loaded pins may be manually withdrawn to enable the wing assemblies 13 to be folded down. Powered locking pin arrangements may include, for example, electrical solenoid or hydraulically driven lock pins.

The structural components of implement 10, such as chassis 18, front frame 35, and wing assemblies 13 are most preferably made from suitable grade steel material in dimensions selected using known engineering analysis methods so that the implement is suitable for use in high load applications such as no-till planting. Load parameters for engineering analysis may be selected based on the most rigorous application anticipated for the implement.

In operation, implement 10, with wing assemblies 13 in the folded-up position depicted in FIG. 3, may be coupled with any suitable tow vehicle such as a tractor, using tongue assembly 26. Wing lock pins 192 are then removed, and hydraulic cylinders 190 actuated to lower wing assemblies 13 to the folded-down position depicted in FIGS. 1 and 2. As hydraulic cylinders 190 begin to extend, wing frames 14 first pivot slightly about lower pivot pins 124, 154, until lateral beams 86 contact arm stops 121, 150. Thereafter, wing assembly 13 pivots about upper pivot pins 134, 164, until wing assembly 13 reaches the folded down position depicted in FIGS. 1 and 2. In this position, wing frames 14 are generally parallel with the ground so that tool assemblies 189 may reach a uniform ground penetration depth. Tool assemblies 189 may be adjusted if necessary for proper operation when in this position. Implement 10 may then be towed by the tow vehicle as necessary to accomplish the desired task. Wing frames 14 pivot about lower pivot pins 124, 154, as needed to adjust for nominal variations in the level of the ground surface as the implement is towed. Pivoting motion of the wing frames 14 about lower pivot pins 124, 154, is limited in each direction by contact of lateral beams 86 with contact pads 118 and arm stops 121.

When implement 10 is to be prepared for transport to a another field or over a public road where a reduced implement width is required, the hydraulic cylinders 190 may be actuated, thereby exerting an upward biasing force on wing frames 14. Wing frame 14 will pivot about lower pivot pins 124, 154, until lateral beams 86 are brought into contact with contact pads 118, 146. Thereafter, as hydraulic cylinder 190 exerts further upward bias, wing assemblies 13 pivot about upper pivot pins 134, 164, until wing frames 14 reach the generally perpendicular position depicted in FIG. 3. Wing lock pins 192 may then be inserted through apertures 196, 198, to lock wing assemblies 13 in position for transport. In the folded-up position, the lowest portion of each wing assembly is positioned at a height over the ground surface, designated H1 in the Figures, greater than the height of the lowest portion of chassis 18 over the ground surface, designated H2 in the Figures.

The folding wing arrangement of the present invention has important advantages over previous folding wing mechanisms for agricultural implements. When wing assemblies 13 are folded out as depicted in FIG. 1, a portion of each wing frame 14 extends between chassis 18 and the ground, with proximal ends 105 of wing frames 14 proximate each other. Tool assemblies 189 are typically uniformly spaced apart along the lateral beams 86 of each wing frame 14. Wing frames 14 extend under chassis 18, thus enabling tool assemblies 189 to be uniformly spaced apart across the entire width of implement 10 between the distal ends 105i a of wing frames 14. Tool coverage for the area under chassis 18 is provided without having tool assemblies 189 mounted on center section 12. When wing assemblies 13 are folded into the transport position, the tool assemblies 189 located under chassis 18 move with the wing assembly 13. With the wing assemblies 13 in the folded-up position, the tool assemblies 189 do not intrude into the space under chassis 18, providing additional ground clearance for transporting implement 10 over rough terrain. In addition, the tool assemblies 189 are protected from damage due to ground contact during transport. Moreover, the tool assemblies 189 do not need extensive readjustment when the wing assemblies 13 are folded-down for the next task.

What is claimed is:

1. An agricultural implement comprising:
a center section including a chassis supported on a plurality of ground engaging wheels so that the chassis is spaced apart from the ground;
said chassis includes a pair of longitudinal beams spaced apart and connected by a front cross-plate and a rear cross plate and a front frame;
a left and right wing frame each having a pair of front and rear lateral beams, end members with opposing ends and a cross-member assembly;
each wing frame includes a pivot arm assembly having a front arm body, a rear arm body and a connecting beam;
said front arm body comprises a pair of spaced apart plates having a tab portion, an inner portion, and top and bottom portions defining a hollow enclosure there between;
an exterior side plate attaches at the periphery of said top portion of said spaced apart plates thereby forming a contact pad;
an interior spacer is attached to said bottom portion of each of said pair of spaced apart plates thereby forming an arm stop;
wherein said bottom portion of said spaced apart plates extends below said contact pad and said arm stop to provide a recess for receiving one of said front lateral beams of said wing frame;
a first lower pivot pin extends through said bottom portion of said pair of spaced apart plates and said front lateral beam;
wherein said front lateral beam is vertically pivotable on said first lower pivot pin between said contact pad and said arm stop;
a first upper pivot pin extends through said tab portion of said spaced apart plates and said front cross plate;
wherein said front arm body is vertically pivotable on said first upper pivot pin;
said rear arm body comprises a rear pair of spaced apart plates having a tab portion, a top portion and a bottom portion defining a hollow enclosure there between;
a rear exterior side plate attaches at the periphery of said top portion of said rear pair of spaced apart plates thereby forming a rear contact pad;
a rear interior spacer is attached to said bottom portion of each of said rear spaced apart plates thereby forming a rear arm stop;
wherein said bottom portion of said rear spaced apart plates extends below said rear contact pad and said rear arm stop to provide a recess for receiving one of said rear lateral beams of said wing frame:
a second lower pivot pin extends through said bottom portion of said rear spaced apart plates and said rear lateral beam;
wherein said rear lateral beam is vertically pivotable on said second lower pivot pin between said rear contact pad and said rear arm stop;
a second upper pivot pin extends through said tab portion of said rear spaced apart plates and said rear cross plate;
wherein said rear arm body is vertically pivotable on said second upper pivot pin;
said connecting beam extends through said spaced apart plates of said front arm body and said rear arm body thereby forming a rigid connection between said front arm body and said rear arm body;
wherein said pivot arm assembly is pivotally attached on said first and second upper pivot pins;
said pair of wings extending laterally on opposite sides of the center section, each of said wing frames having a proximal end and a distal end defining a width dimension there between, said wing frames having a plurality of tool assemblies uniformly spaced apart thereon across the width dimension, said pivot arm assembly of each of said wing frames operably coupled with said center section so that said wing frames are selectively shiftable between a folded-down position wherein said wing frames are generally parallel with the ground and the proximal end of each wing frame extends under the chassis proximate the other wing frame, and a folded-up position wherein the wing frames are generally perpendicular with the ground and the proximal ends of said wing frames are laterally spaced apart from said chassis on opposite sides of said center section.

2. The implement of claim 1, wherein the distal ends of the wing frames of the pair of wings define an implement width dimension therebetween when the wings are in the folded-down position, and wherein the tool assemblies are uniformly spaced apart across the implement width dimension.

3. The implement of claim 1, wherein the chassis has a bottom side defining a space between the bottom side and the ground, and wherein the proximal ends of the wing frames do not intrude into the space when the wings are positioned in the folded-up position.

4. The implement of claim 1, further comprising means for selectively coupling the implement to a tow vehicle.

5. The implement of claim 1, wherein the tool assemblies are planter assemblies.

6. The implement of claim 5, wherein the planter assemblies are single disk opener planter assemblies.

7. The implement of claim 1, further comprising a pair of outrigger wheels, each of the pair of outrigger wheels operably coupled to a separate one of the wing frames proximate the distal end.

8. The implement of claim 1, further comprising a wing lock pin having an aperture and a cotter pin; wherein said tab portion of said pair of spaced apart plates of said front arm body has a locked aperture; wherein when said wing frames are positioned in a folded-up position, inserting said wing lock pin through said apertures of said spaced apart plates of said front arm body and an aperture of said cross plate locks said wing frames in the folded-up position; and wherein said cotter pin is insertable through said aperture of said wing lock pin.

9. The implement of claim 1, further comprising hydraulic means for selectively shifting the wings between the folded-down position and the folded-up position.

10. An agricultural implement system comprising:

A tow vehicle;

An implement selectively operably attachable to the tow vehicle for towing thereby, the implement comprising:

A center section including a chassis operably coupled with a plurality of ground engaging wheels so that said chassis is spaced apart from the ground;

said chassis includes a pair of longitudinal beams spaced apart and connected by a front cross-plate and a rear cross plate and a front frame;

a left and right wing frame each having a pair of front and rear lateral beams, end members with opposing ends and a cross-member assembly;

each wing frame includes a pivot arm assembly having a front arm body, a rear arm body and a connecting beam;

said front arm body comprises a pair of spaced apart plates having a tab portion, an inner portion, and top and bottom portions defining a hollow enclosure there between;

an exterior side plate attaches at the periphery of said top portion of said spaced apart plates thereby forming a contact pad;

an interior spacer is attached to said bottom portion of each of said pair of spaced apart plates thereby forming an arm stop;

wherein said bottom portion of said spaced apart plates extends below said contact pad and said arm stop to provide a recess for receiving one of said front lateral beams of said wing frame;

a first lower pivot pin extends through said bottom portion of said pair of spaced apart plates and said front lateral beam;

wherein said front lateral beam is vertically pivotable on said first lower pivot pin between said contact pad and said arm stop;

a first upper pivot pin extends through said tab portion of said spaced apart plates and said front cross plate;

wherein said front arm body is vertically pivotable on said first upper pivot pin;

said rear arm body comprises a rear pair of spaced apart plates having a tab portion, a top portion and a bottom portion defining a hollow enclosure there between;

a rear exterior side plate attaches at the periphery of said top portion of said rear pair of spaced apart plates thereby forming a rear contact pad;

a rear interior spacer is attached to said bottom portion of each of said rear spaced apart plates thereby forming a rear arm stop;

wherein said bottom portion of said rear spaced apart plates extends below said rear contact pad and said rear arm stop to provide a recess for receiving one of said rear lateral beams of said wing frame:

a second lower pivot pin extends through said bottom portion of said rear spaced apart plates and said rear lateral beam;

wherein said rear lateral beam is vertically pivotable on said second lower pivot pin between said rear contact pad and said rear arm stop;

a second upper pivot pin extends through said tab portion of said rear spaced apart plates and said rear cross plate;

wherein said rear arm body is vertically pivotable on said second upper pivot pin;

said connecting beam extends through said spaced apart plates of said front arm body and said rear arm body thereby forming a rigid connection between said front arm body and said rear arm body;

wherein said pivot arm assembly is pivotally attached on said first and second upper pivot pins;

said pair of wings extending laterally on opposite sides of the center section, each of said wing frames having a proximal end and a distal end defining a width dimension there between, said wing frames having a plurality of tool assemblies uniformly spaced apart thereon across the width dimension, said pivot arm assembly of each of said wing frames operably coupled with said center section so that said wing frames are selectively shiftable between a folded-down position wherein said wing frames are generally parallel with the ground and the proximal end of each wing frame extends under the chassis proximate the other wing frame, and a folded-up position wherein the wing frames are generally perpendicular with the ground and the proximal ends of said wing frames are laterally spaced apart from said chassis on opposite sides of said center section.

11. The system of claim 10, wherein the distal ends of the wing frames of the pair of wings define an implement width dimension therebetween when the wings are in the folded-down position, and wherein the tool assemblies are uniformly spaced apart across the implement width dimension.

12. The system of claim 10, wherein the chassis has a bottom side defining a space between the bottom side and the ground, and wherein the proximal ends of the wing frames do not intrude into the space when the wings are positioned in the folded-up position.

13. The system of claim 10, further comprising means for selectively coupling the implement to said tow vehicle.

14. The system of claim 10, wherein the tool assemblies are planter assemblies.

15. The system of claim 14, wherein the planter assemblies are single disk opener planter assemblies.

16. The system of claim 10, further comprising a pair of outrigger wheels, each of the pair of outrigger wheels operably coupled to a separate one of the wing frames proximate the distal end.

17. The implement of claim 10, further comprising a wing lock pin having an aperture and a cotter pin; wherein said tab portion of said pair of spaced apart plates of said front arm body has a locked aperture; wherein when said wing frames are positioned in a folded-up position, inserting said wing lock pin through said apertures of said spaced apart plates of said front arm body and an aperture of said cross plate locks said wing frames in the folded-up position; and wherein said cotter pin is insertable through said aperture of said wing lock pin.

18. The system of claim 10, further comprising hydraulic means for selectively shifting the wings between the folded-down position and the folded-up position.

19. An agricultural implement comprising:
- a center section including a chassis, a plurality of rear wheel assemblies, a plurality of front wheel assemblies, and a tongue assembly;
- said chassis includes a pair of longitudinal beams spaced apart and connected by a front cross-plate and a rear cross plate and a front frame;
- said longitudinal beams each having a rear end and a front end;
- said front frame includes a front beam coupled to a pair of front wheel mount beams;
- said front beam having a pair of pivot connections;
- said front flame connected to said pair of longitudinal beams;
- said front wheel assemblies pivotally attaches to said pair of front wheel mount beams having a front and rear end;
- said front wheel mount beams having pivots at a rear end, wherein said front wheel assemblies are pivotable about a vertical axis at said pivots of said front wheel mount beams;
- said front wheel assemblies include a pair of wheels rotatably mounted on a wheel tower pivotally attached to said chassis at said pivots of said front wheel mount beams;
- said rear wheel assemblies include an axle and a pair of wheels attached to opposing ends of said axle with rotatable hubs;
- said axle attached to said chassis at said rear ends of said longitudinal beams;
- said tongue assembly includes a tongue member and a hitch;
- said tongue member includes a pair of beams coupled by a pair of cross members;
- said tongue member having a forward end and a rear end;
- said hitch attached at said forward end of said tongue member;
- said rear end of said tongue member coupled to chassis at said pivot connections of said front beam;
- wherein said tongue assembly is vertically pivotable about said pivot connection to enable differential vertical movement of said implement;
- a left and right wing flame each having a pair of front and rear lateral beams, end members with opposing ends and a cross-member assembly;
- said cross-member assembly includes uprights at opposing ends of cross-member assembly;
- said uprights formed by a pair of plates over a spacer;
- wherein said spacer rigidly attaches about said lateral beams;
- said opposing ends of said end members connect to said lateral beams;
- each wing frame includes a pivot arm assembly having a front arm body, a rear arm body and a connecting beam;
- said front arm body comprises a pair of spaced apart plates having a tab portion, an inner portion, and top and bottom portions defining a hollow enclosure there between;
- an exterior side plate attaches at the periphery of said top portion of said spaced apart plates thereby forming a contact pad;
- an interior spacer is attached to said bottom portion of each of said pair of spaced apart plates thereby forming an arm stop;
- wherein said bottom portion of said spaced apart plates extends below said contact pad and said arm stop to provide a recess for receiving one of said front lateral beams of said wing frame;
- a first lower pivot pin extends through said bottom portion of said pair of spaced apart plates and said front lateral beam;
- wherein said front lateral beam is vertically pivotable on said first lower pivot pin between said contact pad and said arm stop;
- a first upper pivot pin extends through said tab portion of said spaced apart plates and said front cross plate;
- wherein said front arm body is vertically pivotable on said first upper pivot pin;
- said rear arm body comprises a rear pair of spaced apart plates having a tab portion, a top portion and a bottom portion defining a hollow enclosure there between;
- a rear exterior side plate attaches at the periphery of said top portion of said rear pair of spaced apart plates thereby forming a rear contact pad;
- a rear interior spacer is attached to said bottom portion of each of said rear spaced apart plates thereby forming a rear arm stop;
- wherein said bottom portion of said rear spaced apart plates extends below said rear contact pad and said rear arm stop to provide a recess for receiving one of said rear lateral beams of said wing frame:
- a second lower pivot pin extends through said bottom portion of said rear spaced apart plates and said rear lateral beam;
- wherein said rear lateral beam is vertically pivotable on said second lower pivot pin between said rear contact pad and said rear arm stop;
- a second upper pivot pin extends through said tab portion of said rear spaced apart plates and said rear cross plate;
- wherein said rear arm body is vertically pivotable on said second upper pivot pin;
- said connecting beam extends through said spaced apart plates of said front arm body and said rear arm body thereby forming a rigid connection between said front arm body and said rear arm body;
- wherein said pivot arm assembly is pivotally attached on said first and second upper pivot pins;
- each wing frame having a proximal end and a distal end defining a width dimension there between, said wing frames having a plurality of tool assemblies uniformly spaced apart thereon across the width dimension, said pivot arm assembly of each wing frame operably coupled with the center section so that said wing frames are selectively shiftable between a folded-down position wherein said wing frames are generally parallel with the ground and the proximal end of each of said wing frames extends under the chassis proximate the other of said wing frames, and a folded-up position wherein said wing frames are generally perpendicular with the ground and the proximal ends of each of said wing frames are laterally spaced apart from said chassis on opposite sides of said center section.

* * * * *